United States Patent
Duncan

(10) Patent No.: US 7,458,691 B2
(45) Date of Patent: Dec. 2, 2008

(54) HOLOGRAPHIC COMBINERS FOR ILLUMINATION OF SPATIAL LIGHT MODULATORS IN PROJECTION SYSTEMS

(75) Inventor: Walter M. Duncan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 330 days.

(21) Appl. No.: 11/160,128

(22) Filed: Jun. 9, 2005

(65) Prior Publication Data

US 2006/0279816 A1    Dec. 14, 2006

(51) Int. Cl.
　　G03B 21/26　　(2006.01)
　　G03B 21/28　　(2006.01)
　　G02B 5/32　　(2006.01)
　　G02B 27/44　　(2006.01)
　　G02B 27/46　　(2006.01)
　　G03H 1/02　　(2006.01)
　　G09G 3/14　　(2006.01)
　　G09G 3/32　　(2006.01)
　　G01J 3/28　　(2006.01)

(52) U.S. Cl. .......................... 353/94; 353/37; 353/121; 359/15; 359/27; 359/563; 359/558; 345/46; 345/82; 356/328

(58) Field of Classification Search ................... 353/94, 353/37, 121; 359/15, 27, 563, 558; 345/46, 345/82, 27; 356/328, 800
See application file for complete search history.

(56) References Cited

U.S. PATENT DOCUMENTS

| 6,583,873 | B1 * | 6/2003 | Goncharov et al. | 356/326 |
| 6,734,889 | B2 * | 5/2004 | Ramanujan et al. | 347/239 |
| 2002/0126479 | A1 | 9/2002 | Zhai et al. | |
| 2003/0001953 | A1 | 1/2003 | Rancuret et al. | |
| 2004/0021871 | A1 * | 2/2004 | Psaltis et al. | 356/451 |
| 2004/0184717 | A1 | 9/2004 | Koontz et al. | |
| 2004/0239585 | A1 | 12/2004 | Lee | |
| 2004/0264971 | A1 | 12/2004 | Koontz | |

FOREIGN PATENT DOCUMENTS

EP    1 569 466 A2    8/2005

* cited by examiner

Primary Examiner—Diane I. Lee
Assistant Examiner—Magda Cruz
(74) Attorney, Agent, or Firm—Wade James Brady, III; Frederick J. Telecky, Jr.

(57) ABSTRACT

Described is an optical device for combining multiple light sources in an optical projection system. One embodiment of the optical device includes at least two light sources having first and second wavelengths, and an optical element for substantially diffracting the first and second wavelengths of the two light sources and combining them into a single beam of light.

15 Claims, 3 Drawing Sheets

HOLOGRAPHIC COMBINERS FOR ILLUMINATION OF SPATIAL LIGHT MODULATORS IN PROJECTION SYSTEMS

TECHNICAL FIELD

Disclosed embodiments relate to optical projection systems, and more particularly to holographic combiners for illuminating spatial light modulators.

BACKGROUND

Optical projection systems generally require an illumination source to project an image. Xenon, metal halide, and mercury arc lamps are suitable light sources but they have poor efficiencies because most of the electrical energy is converted to heat and wasted prior to being used by the system. Light emitting diodes (LEDs) and lasers are alternative light sources for optical projection systems because of their increased efficiency. Unlike emissions of an arc lamp, however, LED emissions are based on electron transition energy levels and therefore have relatively narrow range of wavelengths, while laser emissions are coherent (identical phase/frequency) and generate narrow beams in a narrow wavelength spectrum. Thus, to achieve broad-spectrum illumination from several narrow band sources, there exists a need to effectively combine LEDs and lasers within an optical projection system.

SUMMARY

Described are optical devices for combining multiple light sources of an optical projection system for added efficiency and performance. One embodiment of the optical device includes at least two light sources having first and second wavelengths, and an optical element for substantially diffracting the first and second wavelengths of the two light sources and combining them into a single beam of light. In other embodiments, the optical element may be an optically diffractive element or a holographic element such as a holographic filter or grating. In addition, the holographic grating may be a transmission holographic grating or a reflection holographic grating. Upon combining the multiple light sources into a single beam of light, that single, combined beam propagates substantially together in a single direction.

DETAILED DESCRIPTION

Figure 1:
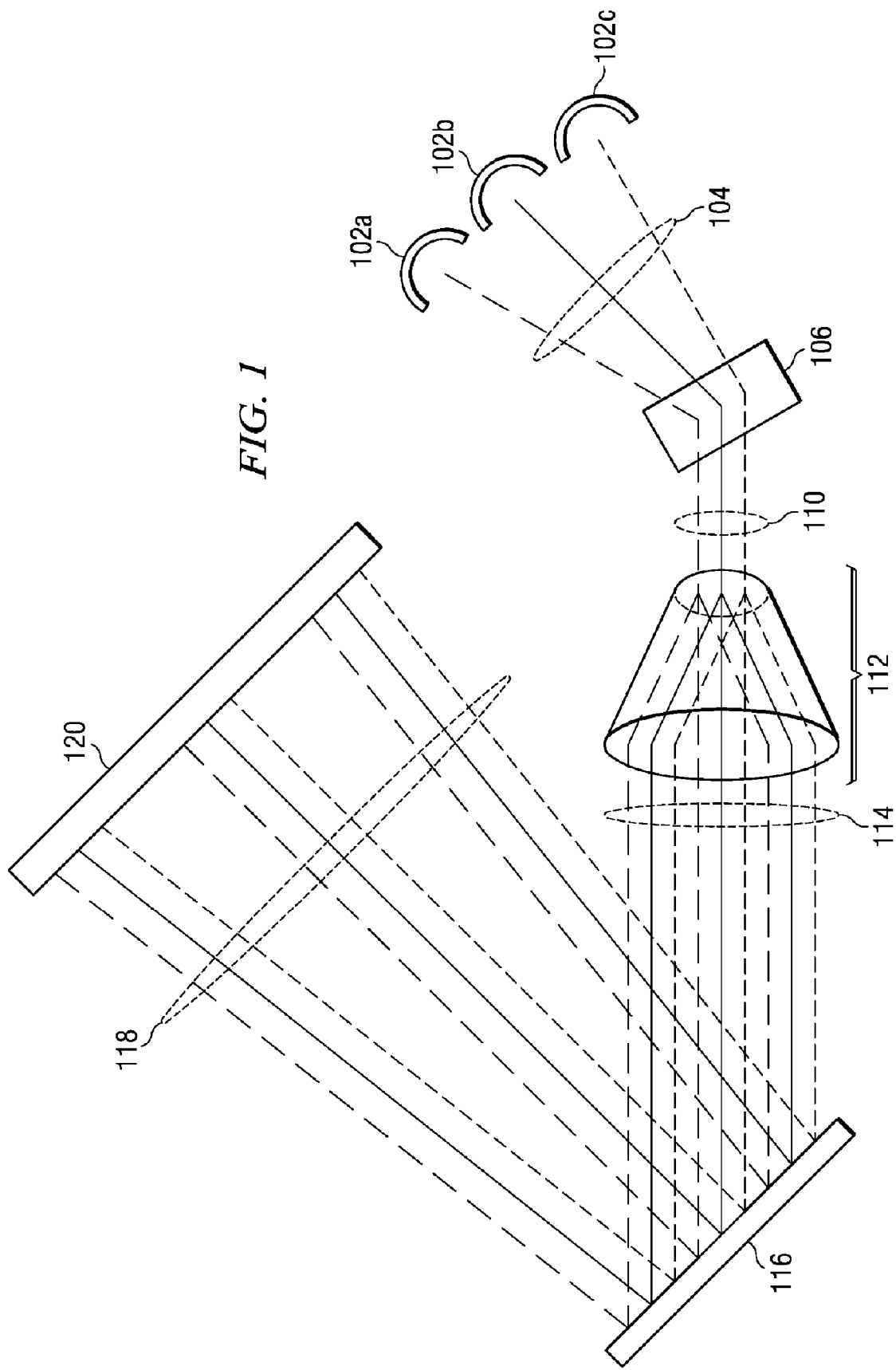
FIG. 1 illustrates the various elements, devices, and components of an optical projection system.

FIG. 1 illustrates the various elements, devices, and components of an optical projection system generally starting with a light source 102, such as light emitting diodes (LEDs) or lasers. Possible LED colors 102 include red, green, and blue, whereby a specific color emits a specific wavelength of light. Additionally, different LED colors or arrays of LEDs may be simultaneously used within the system. In one embodiment, the uppermost light source 102a may be a red LED, the center light source 102b may be a green LED, and the lowermost light source 102c may be a blue LED. Likewise, solid-state lasers emitting different wavelengths of light may also be used. Possible lasers include He—Ne (helium-neon) lasers emitting red light at 0.6328 μm and argon-ionized lasers emitting blue light at 0.4880 μm. The light sources 102 may also be pulsed for increased lifetime performance instead of running on continuous-wave (CW) or continuous emission modes.

The beams of light 104 generated by the light sources 102 are diffracted by an optical element 106 and combined into a single beam of light 110. Detailed discussion on diffracting and combining the beams of light 104 with the optical element 106 will follow. The combined single beam of light 110 is projected onto beam shaping elements 112 such as relay lenses, condensing lenses, color filters, or shaping lenses. The shaped beam of light 114 may then be projected onto a spatial light modulator 116, such as a digital micromirror device (DMD) 116, and then onto a projection lens 118 before reaching an image plane or a screen 120. Additionally, an integrator (not shown) may also be added to the system for integrating the combined beam of light 110 or the shaped beam of light 114. Also, the spatial light modulator 116 can simultaneously modulate both the phase and the intensity of the shaped light beam 114.

Figure 2:
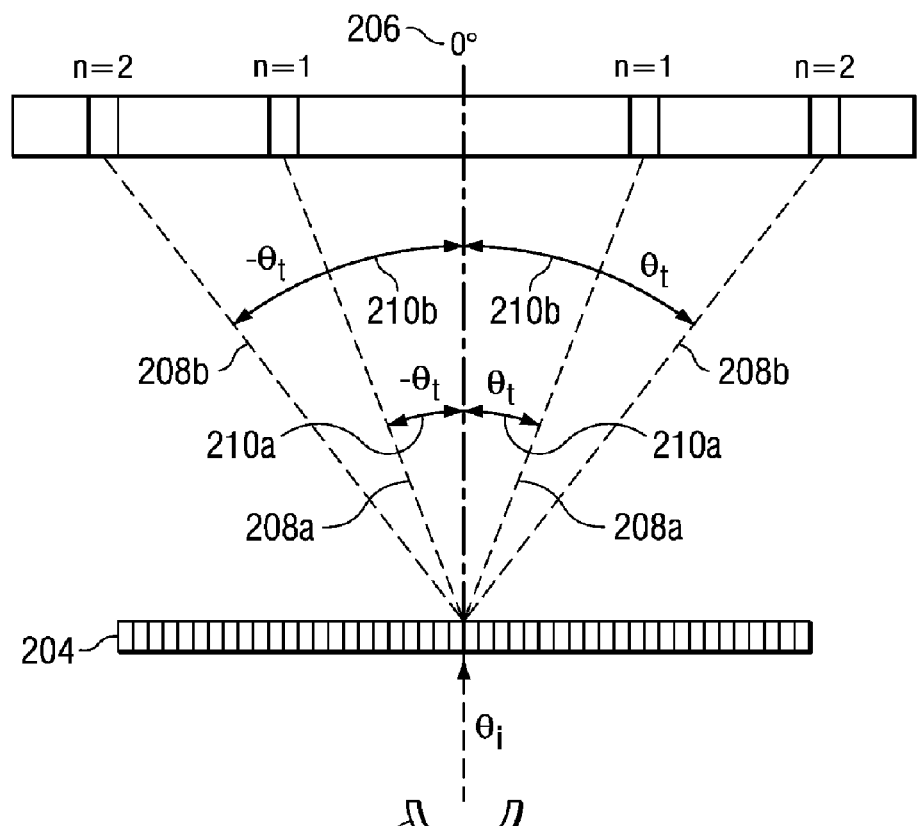
FIG. 2 illustrates the diffraction pattern of light through an optical element.

FIG. 2 illustrates the diffraction pattern of light through an optical element. As shown, transmission of a beam of light 202 through an optical element 204 such as a diffraction grating will result in a straight-ahead beam 206 and a series of beams 208 to either side and at different angles 210. The optical element 204 may also be a diffraction filter or a holographic filter. A diffraction grating 204 is an optical component that has a number of parallel or equally spaced lines at a certain pitch, and is capable of dispersing a beam of light 202. The straight-ahead beam 206 is the zero-order beam, while the series of beams 208 to either side are the first-order beams 208a, the second-order beams 208b, and higher orders (not shown). The angle of transmission or diffraction $\theta_t$ 210 may be calculated as follows:

$\sin \theta_i + \sin \theta_t = (n\lambda/P)$; wherein $\theta_i$ is the angle of incidence or the incident angle of the incoming beam, n is the order number, $\lambda$ is the wavelength of the light 202, and P is the pitch or period of the diffractive element 204.

For example, the angle of diffraction $\theta_t$ 210a for a first order (n=1) red HeNe laser (0.6328 μm) 202 projected with a 0° angle of incidence $\theta_i$ at a 2.0 micron pitch grating 204 would be about 18 degrees. The angle of diffraction $\theta_t$ 210 is measured relative to the zero-order beam 206 and may be adjusted by changing the light source 202 or the grating 204 of the system. Furthermore, there are positive and negative portions of the angle of diffraction $\theta_t$ 210 because the incident angle may be positive or negative.

Figure 3:
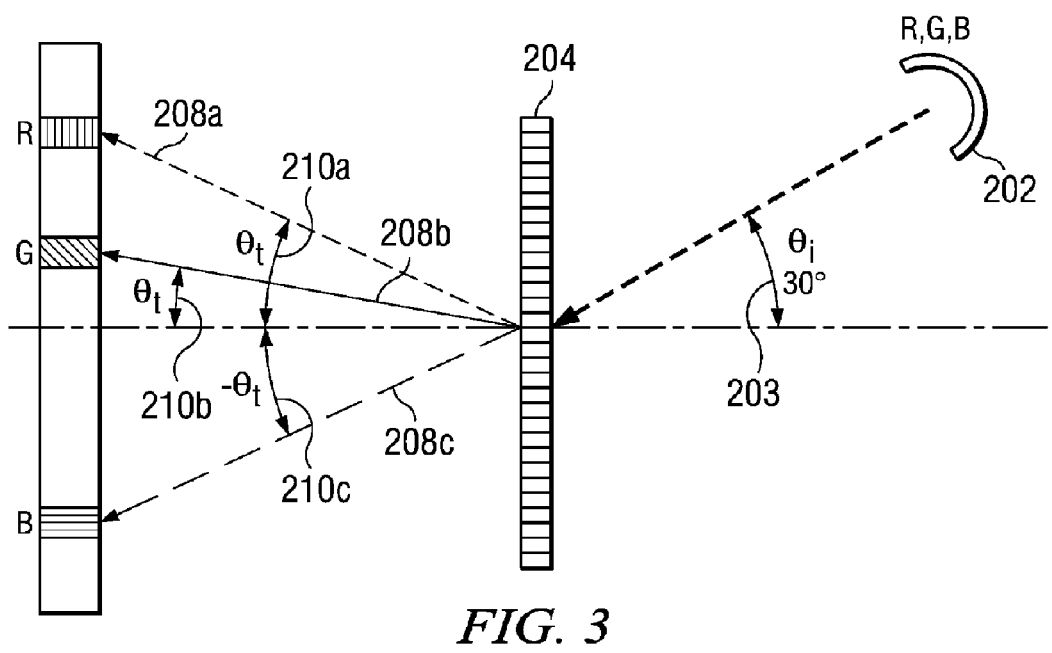
FIGS. 3-4 illustrate an optical device of the presently disclosed embodiment and the principle behind the device.

Using the relationships as discussed above, FIGS. 3-4 illustrate an optical device of the presently disclosed embodiment and the principle behind the device. In FIG. 3, the diffraction and grating principles as discussed above are further elaborated for a light source with multiple wavelengths. In the figure, a beam of light 202 containing red (0.6328 μm), green (0.5435 μm), and blue (0.4400 μm) components are projected toward a diffraction grating 204 at an incident angle $\theta_i$ 203 of 30 degree. With a diffraction grating 204 having a pitch of 1.063 μm (9400 lines per millimeter), the first-order angles of diffraction $\theta_t$ 210 for the different colors may be calculated using a mathematically rearranged version of the equation as previously described:

$$\theta_i = \sin^{-1}[(n\lambda/P) - \sin\theta_t].$$

Figure 4:
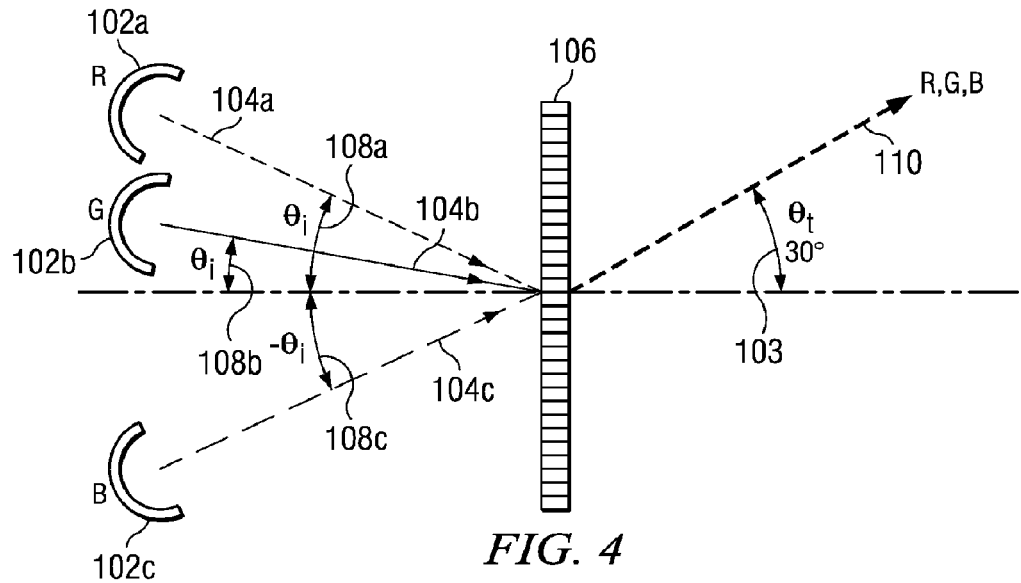

Using the equation above, a diffracted red light 208a will have an angle of diffraction $\theta_t$ 210a of about 5.47 degree, a diffracted green light 208b will have an angle of diffraction $\theta_t$ 210b of about 0.65 degree, and a diffracted blue light 208c will have an angle of diffraction $\theta_t$ 210c of about −4.94 degree. Due to the diffractive nature of the optical element 204 and the incident $\theta_i$ and transmission $\theta_t$ angles being interchangeable because of the relationship in the previously described equation, multiple light sources 102 with different wavelengths 104 may be positioned at different angles and be diffracted and combined by an optical element 106 to produce a single beam of light 110 as illustrated in FIG. 4. In other words, the diffraction theory may be used and worked in reverse to diffract and combine multiple light sources 102 with multiple wavelengths 104 into a single beam of light 110. Furthermore, the combined single beam of light 110 may subsequently be projected in a substantially common optical path.

In the figure, three different wavelengths of light 104 from three different light sources 102 are projected toward an optical element 106. Although three light sources 102 are illustrated, in other embodiments, two, four, five or more light sources 102 may be used. In one embodiment, the uppermost light source 102a may be a red LED generating a wavelength of 0.6328 μm 104a, the center light source 102b may be a green LED generating a wavelength of 0.5435 μm 104b, and the lowermost light source 102c may be a blue LED generating a wavelength of 0.4400 μm 104c. Under the same diffraction and grating principle as previously discussed, and positioning these light sources 102 at angles of incidence 108 using the angles of diffractions 210 calculated from above, the three lights 102 may be diffracted and combined to output a single beam of light 110 at a fixed diffraction angle of 30 degree as is illustrated in the figure.

From the calculations above and in FIG. 3, we know that a diffracted first-order red light 208a (0.6328 μm) has an angle of diffraction $\theta_t$ 210a of about 5.47 degree if the incident angle was 30 degree and the grating pitch was 1.063 μm. Conversely, if we position the red light source 102a at an incident angle $\theta_i$ 108a of 5.47 degree relative to the optical grating 106 as is shown in FIG. 4, the diffracted first-order red light with the same grating 106 will have a diffracted angle $\theta_t$ 103 of about 30 degree according to the previously described equation. Similarly, a green light source 102b (0.5435 μm) having an angle of incidence $\theta_i$ 108b of 0.65 degree will be diffracted by an angle $\theta_t$ 103 of 30 degree. Likewise, a blue light source 102c (0.4400 μm) having an incident angle $\theta_i$ 108c of −4.94 degree upon the optical grating 106 will also be diffracted by 30 degree. The diffracted first-order beams of the three light sources 102 are consequently combined into a single beam of light 110 projecting with the same angle of diffraction $\theta_t$ 103 based on different incident angles $\theta_i$ 108. Furthermore, depending on the type of diffraction grating 106 used in the system, the position of the light sources 102, the incident angles $\theta_i$ 108, and the angles of diffraction $\theta_t$ 103 may be manipulated.

In other embodiments, second-order beams (not shown) or higher-order beams (not shown) may also be combined into a single beam of light 110 using the same concept. Furthermore, although the lights are arranged as red 102a, green 102b, and blue 102c, different configurations and orientations may be implemented based on experimental studies and designs, as well as choosing the proper diffraction grating 106.

Figure 5:
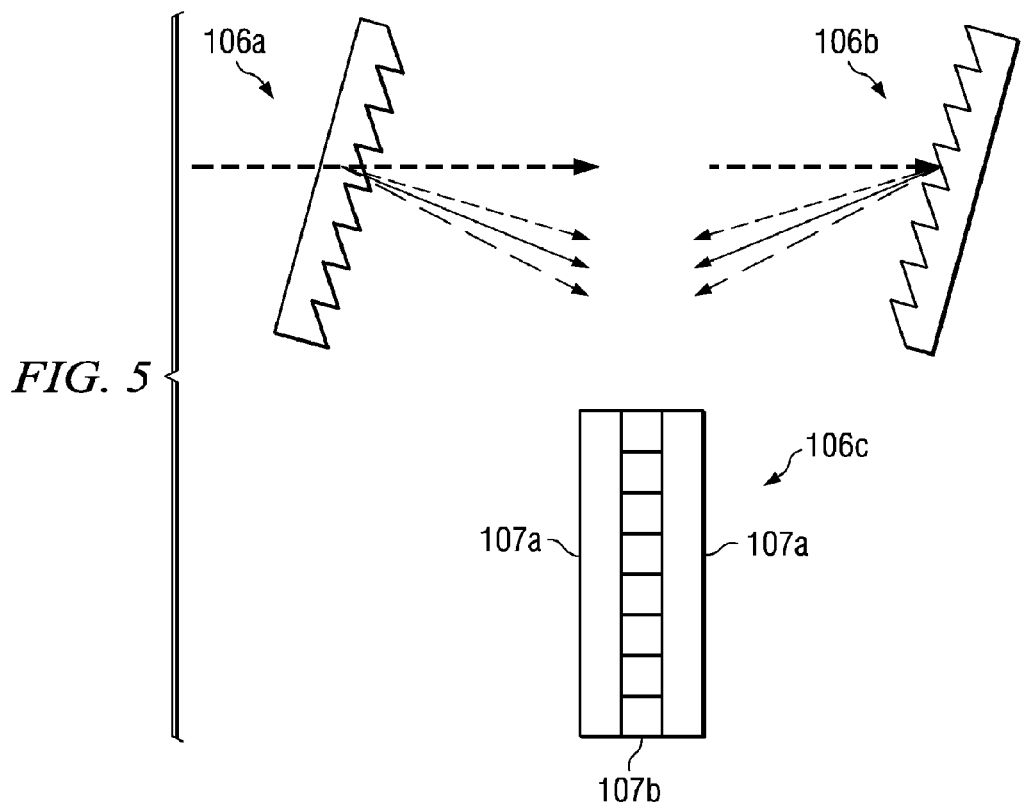
FIG. 5 illustrates the different types of optical elements that may go into an optical device of the presently disclosed embodiment.

FIG. 5 illustrates the different types of optical elements 106 that may go into an optical device, in particular diffractive elements such as optical gratings. As illustrated in previous figures, the preferred optical grating 106 is a transmission diffraction grating 106a, whereby some portion of light is transmitted straight through the grating while other portions are transmitted and diffracted at some angle. Additionally, the presently disclosed embodiments may also utilize a reflection diffraction grating 106b, whereby the lights are diffracted and reflected. Both of these diffraction gratings 106a, 106b have sinusoidal, saw-tooth like, or square surface corrugations. These corrugations may be on one side or on both sides. The corrugations are usually etched into the surface of a piece of glass and then the surface is coated with a highly reflective material. Types of optical glass that may be used include BK7 and fused silica. The diffraction gratings 106 may be customized but may also be commercially available.

Furthermore, a volume phase holographic (VPH) grating 106c may also be used. The VPH grating 106c is generally fabricated by putting a thin film of sensitized gelatin 107b between two glass substrates 107a. The gelatin is exposed to a lithographic system to record the wave pattern and the desired fringe frequency and orientation. The figure illustrates a VPH transmission grating 106c with perpendicular fringes 107b although tilted, slanted, and parallel fringes may also be fabricated. The gelatin 107b pitch may range from 1 to 20 microns translating into 500 to 10,000 lines per millimeter (l/mm) depending on the type of lithographic system used to make the VPH grating 106c. In a specific embodiment, the VPH transmission grating 106c has about 9400 l/mm.

It will be appreciated by those of ordinary skill in the art that the invention can be embodied in other specific forms without departing from the spirit or essential character thereof. For example, the incident and diffracted angles are not drawn to scale and were exaggerated for illustration purposes. Additionally, the individual wavelengths as listed (e.g. HeNe laser at 0.6328 μm) are in no way meant to be absolute, but were done for ease of calculation and illustrative purpose. A HeNe laser as well as other light sources may emit a range of wavelengths. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. § 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method of manufacturing an optical device for an optical projection system, the method comprising:
   providing a first light source emitting light of a first wavelength along a first path;
   providing a second light source emitting light of a second wavelength along a second path;
   substantially diffracting the first and second wavelengths of the two light sources and combining them into a single beam of light with an optical element;
   modulating the single beam of light by a spatial light modulator; and
   focusing the modulated beam of light onto an image plane.

2. A method according to claim 1, wherein substantially diffracting and combining the two light sources with an optical element comprises the optical element being an optical diffraction element.

3. A method according to claim 1, wherein substantially diffracting and combining the two light sources with the optical element comprises the optical element being a holographic filter.

4. A method according to claim 1, wherein substantially diffracting and combining the two light sources with the optical element comprises the optical element being a holographic grating.

5. A method according to claim 4, wherein substantially diffracting and combining the two light sources with the holographic grating comprises the holographic grating being selected from the group consisting of a transmission holographic grating, a reflection holographic grating, and a volume embedded holographic grating.

6. A method according to claim 1, further comprising propagating the combined beam of light in substantially one common optical path with the optical element.

7. A method according to claim 1, wherein the first light source comprises one or more light emitting diodes.

8. An optical projection system, comprising:
   an optical device comprising:
      a first light source emitting light of a first wavelength along a first path;
      a second light source emitting light of a second wavelength along a second path; and
      an optical element for substantially diffracting the first and second wavelengths of the two light sources and combining them into a single beam of light;
   at least one modulator for receiving and modulating the single beam of light; and
   at least one projection lens for focusing the modulated beam of light onto an image plane.

9. A system according to claim 8, wherein the optical element of the optical device comprises an optical diffraction element.

10. A system according to claim 8, wherein the optical element of the optical device comprises a holographic filter.

11. A system according to claim 8, wherein the optical element of the optical device comprises a holographic grating.

12. A system according to claim 11, wherein the holographic grating of the optical device is selected from the group consisting of a transmission holographic grating, a reflection holographic grating, and a volume embedded holographic grating.

13. A system according to claim 8, wherein the optical element of the optical device further propagates the combined beam of light in substantially one common optical path.

14. A system according to claim 1, wherein the at least two light sources of the optical device comprise light emitting diodes or lasers.

15. A method according to claim 1, wherein the first light source comprises one or more lasers.

* * * * *